Patented June 11, 1946

UNITED STATES PATENT OFFICE 2,401,983

MOTOR FUELS

Albert L. Stanly and Alfred G. Cattaneo, Berkeley, Calif., assignors to Shell Development Company, San Francisco, Calif., a corporation of Delaware No Drawing. Application July 5, 1941,
Serial No. 401,214

9 Claims. (Cl. 44—80)

This invention relates to improved aviation grade motor fuels for use in internal combustion spark ignition engines operating on the Otto cycle and more particularly deals with blended fuels of reduced knocking tendencies in supercharged spark ignition engines.

As is known, supercharging is the most important method of markedly raising the power output of internal combustion engines. The degree of supercharging is limited by the knocking property of the fuel, for all fuels have a critical compression pressure above which they detonate spontaneously. For a given fuel, there is a fuel mixture strength determinable by increasing the cylinder pressure as by supercharging the engine until a knock is perceptible, which mixture gives maximum detonation. As is known, octane numbers are determined at this mixture strength. A study of the problem of engine knock has revealed that even though some fuels have substantially the same octane rating, their performance varies markedly in engines which are supercharged to increase the power output.

The differences in performance can be explained by the fact that, other conditions such as speed being maintained constant, the power output of an engine will vary practically directly with the intake manifold pressure. By increasing the ratio of fuel to air, the tendency of a fuel to cause knocking is suppressed within limits with the result that, with enriched mixtures, higher pressures can be reached without encountering knock than with lean mixtures. For each fuel there is a determinable fuel mixture which withstands higher pressures and thus allows higher power output without detonating than any other mixture of that fuel.

The practical value of a fuel can further be gauged by comparing specific fuel consumption, first, under conditions for most efficient practical engine operation, e. g. cruising power output of engines and secondly, under conditions to obtain maximum power output. If, due to lower heat content, it is necessary to use greater quantities of fuel to obtain a power output equal to another fuel, the lower heat content fuel is relegated to use in small quantities as a blending agent when operating under conditions for low specific fuel consumption, e. g. cruising. However, if the maximum power output of the low heat content fuel is relatively high, the fuel still may have particular utility for use during short periods such as takeoffs of airplanes, since the extra fuel consumed just during the takeoff would be small. Of course, a fuel with as low specific fuel consumption as possible at all power outputs is obviously of importance in airplanes to obtain the highest performance for the minimum dead weight carried.

Now we have discovered that the various normally liquid iso-octanes such as 2,2,4-trimethyl pentane, 2,3,3-trimethyl pentane, 2,3,4-trimethyl pentane and 2,2,3-trimethyl pentane give markedly different maximum power outputs.

2,2,4-trimethyl pentane, more commonly referred to as iso-octane, is the standard of comparison for rating fuels according to the maximum power output, iso-octane being taken as 1. Although it is the 100 octane number standard of comparison, 2,2,4-trimethyl pentane is now shown to have by far the lowest maximum power output of the trimethyl pentanes. If the maximum power output of the 2,2,4-trimethyl pentane is 1.0, those of the other trimethyl pentanes are as follows: 2,3,4-trimethyl pentane, 1.29; 2,3,3-trimethyl pentane, 1.41; and 2,2,3-trimethyl pentane, 1.58.

Analysis of many samples has shown that the above mentioned trimethyl pentanes are present in considerable quantities in commercial iso-octanes, particularly in the hydrogenated polymerization products obtained by the hot or cold sulfuric acid polymerization processes, or in alkylates produced by alkylation of butylenes with isobutane. The boiling points of the above trimethyl pentanes are: 2,2,4-trimethyl pentane, 100° C., 2,3,4-trimethyl pentane, 113° C., 2,3,3-trimethyl pentane, 114° C., 2,2,3-trimethyl pentane, 110° C.

Naturally the composition of various commercial iso-octanes varies with the method of treatment, feed stocks, etc.; 2,2,4-, 2,3,4- and 2,3,3-trimethyl pentanes are found in all commercial iso-octanes. For some reason, unexplained at present, 2,2,3-trimethyl pentane is found in appreciable quantities only in hot acid octanes.

In carrying out our invention we fractionate suitable commercial iso-octanes, normally boiling between about 30° C. and 150° C. to recover a fraction boiling between 105° C. and 115° C. Hot acid octanes yield fractions boiling within this range, which fractions consist predominantly of 2,3,3-, 2,3,4- and 2,2,3-trimethyl pentanes and are substantially free of 2,2,4-trimethyl pentane. Cold acid octanes or alkylates on the other hand yield similar fractions which unfortunately are substantially devoid of the very valuable 2,2,3-trimethyl pentane as well. Therefore hot acid octanes are in general preferred for producing this fraction.

The described fraction by itself is excellently suited for use as a high power output fuel in engines equipped for fuel injection, but its use is not restricted to this alone. The fraction produced, because of its high maximum power output, has special value as a base about which to build blended fuels which must meet stringent requirements of volatility, power, etc. of aviation fuels for use in engines having fuel carburetors.

Aviation fuels may be produced by blending our trimethyl pentane fraction with aromatics, preferably having not more than 9 carbon atoms, e. g. toluene, benzene, ethylbenzene, cumene xylenes, etc.; ethers such as the dialkyl ethers having at least one tertiary alkyl radical and boiling below 75° C., e. g. methyl tertiary butyl ether, isopropyl tertiary butyl ether, etc.; triptane, dimethyl butanes, cyclopentane, isopentane, etc.

Cyclopentane, isopentane and the tertiary alkyl ethers boiling below 75° C. may be added to our trimethyl pentane fraction in limited quantities to increase the front end volatility, causing but little decrease and generally an increase in maximum power output of the blended fuel. For instance, cyclopentane may, if desired, be added in quantities up to 50% by weight of the blended fuel. Ethers due to their lower heat content and consequent high specific fuel consumption are preferably used in lower concentrations, e. g. not exceeding about 25% by weight of the blended fuel. The ethers may be used alone or in conjunction with other blending agents. By cyclopentane or isopentane, we mean, of course, either the pure hydrocarbons or those fractions composed predominantly of either of these compounds.

Aromatics boiling within aviation gasoline boiling range may be used in our blends in concentrations up to about 50% with the exception of benzene which raises the freezing point so markedly that it is usually limited to amounts not in excess of about 20% by weight of the blended fuel. In general, a content of aromatics ranging between 10% and 30% is preferred, because such blends possess maximum power curve characteristics similar to those of the aromatics themselves, and maximum power outputs which, while inferior to pure aromatics, are higher than those of the iso-octanes, and at the same time permit the high fuel economy characteristics of paraffinic fuels under cruising conditions.

Triptane, i. e., 2,2,3-trimethyl butane, and the dimethyl butanes may also be used in our blends.

The anti-detonation properties of both blended and unblended fuels prepared with our iso-octane fraction, can be fortified or increased by addition of tetra-ethyl lead and other organo-metallic anti-knock agents.

The following example illustrates our invention:

Example I

A blend was prepared of 50% by volume of a trimethyl pentane fraction boiling between 105° C. and 115° C. and 50% by volume of 73 octane number straight-run aviation base stock and 3 c. c. T. E. L./gal. of fuel. The trimethyl pentane fraction was obtained by fractionally distilling a full range alkylate gasoline. While running the engine on this blend at a normal fuel-air ratio, the intake pressure was raised until a knock was perceptible. The fuel mixture was then enriched and the intake pressure again increased until knocking was encountered. The pressures at which the various enriched fuel-air ratios gave knocking were determined until the maximum pressure (I. M. E. P.) sustainable by the enriched fuel mixtures was found.

Two other blends similar to the one described above, in which the trimethyl pentane fraction was used, were prepared using standard iso-octane and a full boiling range C₄ alkylate instead. The blends were tested as described. Results of the tests of the three blends were as follows:

| Blend | I. M. E. P. |
|---|---|
| 50% full boiling range C₄ alkylate<br>50% straight run base stock<br>3 c. c. T. E. L./gal | 177 |
| 50% trimethyl pentane fraction boiling range 105 to 115° C.<br>50% straight run base stock<br>3 c. c. T. E. L./gal | 185 |
| 50% 2,2,4-trimethyl pentane<br>50% straight run base stock<br>3 c. c. T. E. L./gal | 175 |

We claim as our invention:

1. An improved motor fuel for supercharged spark ignition engines comprising a major amount of a trimethyl pentane fraction boiling between 105° C. and 115° C. and a minor amount of an aromatic hydrocarbon fraction.

2. An improved motor fuel for supercharged spark ignition engines comprising a major amount of a fraction consisting essentially of trimethyl pentanes boiling between 105° C. and 115° C. and a minor amount of an aromatic hydrocarbon having a maximum of 9 carbon atoms.

3. An improved motor fuel for supercharged engines comprising a major amount of a blend consisting of a minor amount of an aromatic hydrocarbon and a major amount of a non-aromatic hydrocarbon, the non-aromatic portion of which comprises a major amount of a trimethyl pentane fraction boiling between 105° C. and 115° C.

4. An improved motor fuel for supercharged engines comprising a major amount of a blend consisting of 10 to 30% aromatic hydrocarbons, the balance being non-aromatic hydrocarbons, the non-aromatic portion of which comprises a major amount of a trimethyl pentane fraction boiling between 105° C. and 115° C.

5. An improved motor fuel for supercharged engines comprising a major amount of a blend consisting of a minor amount of alkyl benzenes having from 1 to 3 carbon atoms in the alkyl radicals and a major amount of a trimethyl pentane fraction boiling between 105° C. and 115° C.

6. An improved motor fuel for supercharged engines comprising not more than 50% of cyclopentane, the remainder being a trimethyl pentane fraction boiling between 105° and 115° C.

7. An improved motor fuel for supercharged engines comprising a major amount of a blend consisting of a trimethylpentane fraction boiling between 105° C. and 115° C., and up to 50% by weight of the blend, of a mixture consisting of cyclopentane and not more than 50% of aromatic hydrocarbons.

8. An improved motor fuel for supercharged engines, said fuel comprising a major amount of blend consisting of a minor amount of aromatic hydrocarbons having a maximum of 9 carbon atoms per molecule and a major amount of a trimethyl pentane fraction boiling between 105 and 115° C.

9. The composition of claim 8 wherein said minor amount of aromatic hydrocarbons is from 10 to 30% of said blend.

ALBERT L. STANLY.
ALFRED G. CATTANEO.